United States Patent [19]

Krag

[11] Patent Number: 5,339,767
[45] Date of Patent: Aug. 23, 1994

[54] AUTOMATIC BIRD FEEDER

[76] Inventor: Jeffrey B. Krag, 215 DiNard Rd., Rossville, Tenn. 38066

[21] Appl. No.: 66,209

[22] Filed: May 25, 1993

[51] Int. Cl.⁵ ............................................. A01K 39/01
[52] U.S. Cl. ..................................................... 119/57.8
[58] Field of Search .................... 119/51.03, 57.8, 57.9

[56] References Cited

U.S. PATENT DOCUMENTS

| | | | |
|---|---|---|---|
| 1,123,501 | 1/1915 | Dreibelbis | 119/57.8 X |
| 3,482,549 | 12/1969 | Episcopo | 119/51.03 |
| 3,653,361 | 4/1972 | Holliday | 119/57.8 |
| 4,294,197 | 10/1981 | Snel et al. | 119/60 |
| 5,235,935 | 8/1993 | Edwards | 119/57.8 |

FOREIGN PATENT DOCUMENTS 135280  11/1949  Australia ............... 119/57.8

*Primary Examiner*—Robert P. Swiatek
*Attorney, Agent, or Firm*—Walker, McKenzie & Walker

[57] ABSTRACT

A bird feeder including a pipe having a hollow interior for holding a supply of bird feed. The lower end of the pipe is embedded in the ground. The upper end of the pipe is opened. A coil spring is positioned within the pipe. Support structure is provided for supporting the lower end of the coil spring. A plunger is slidably positioned within the pipe and positioned on the upper end of the coil spring. A cable extends from the plunger to a point below the coil spring. A winch is attached to the end of the cable opposite the plunger for pulling the plunger downwardly to compress the coil spring. A rigid platform is attached to and encircles the open upper end of the pipe. The open upper end of the pipe is closed by a cover that keeps the bird feed within the pipe under tension while allowing birds to pick bird feed therefrom and while preventing bird feed from freely passing out the open upper end of the pipe. A clear robe is positioned on the exterior of the pipe and a magnetic piston is slidably positioned within the clear tube for coacting with a magnetic member attached to the plunger for showing the level of the bird feed in the hollow interior of the pipe.

1 Claim, 3 Drawing Sheets

AUTOMATIC BIRD FEEDER

BACKGROUND OF THE INVENTION

1. Field of the Invention

The present invention relates, in general, to a bird feeder that automatically dispenses bird feed upwardly from a lower reservoir to an upper feed platform.

2. Description of the Prior Art

Most bird feeders now on the market are gravity fed feeders which dispense feed downwardly from an upper reservoir to a lower feed port or the like. Feeding birds on one side of such gravity fed feeders are normally hidden from view from the opposite side. Another common type of bird feeder is the flat platform feeder which provides a full view of feeding birds but which is susceptible to wind blowing feed off the platform. Some bird feeders are designed to dispense only certain type of seeds. Most prior art feeders can only hold a small amount of seed, which might last for only one or two days.

Nothing in the known prior art discloses or suggests the present invention. More specifically, nothing in the known prior art discloses or suggests a bird feeder including a pipe having a hollow interior for holding a supply of bird feed, a lower end embedded in the ground, and an open upper end; a coil spring positioned within the pipe; support means for supporting the lower end of the coil spring; a plunger slidably positioned within the pipe and positioned on the upper end of the coil spring; a cable extending from the plunger to a point below the coil spring; a winch attached to the end of the cable opposite the plunger for pulling the plunger downwardly to compress the coil spring; a rigid platform attached to and encircling the open upper end of the pipe; cover means for closing the open upper end of the pipe for keeping the bird feed within the pipe under tension, the cover means having apertures therethrough sized to allow birds to pick bird feed therethrough while preventing bird feed from freely passing out the open upper end of the pipe; a clear tube positioned on the exterior of the pipe; and a magnetic piston slidably positioned within the clear tube for a coacting with a magnetic member attached to the plunger for showing the level of the bird feed in the hollow interior of the pipe.

SUMMARY OF THE INVENTION

The present invention is designed to overcome some of the disadvantages of prior bird feeders. The bird feeder of the present invention allows a smooth flow of any type of seed upward through a pipe to a platform where birds land and feed. The birds can eat the seeds through a wire mesh door which covers the opening of the pipe on top of the platform. As the birds remove seeds through the wire mesh door, a spring positioned within the pipe automatically pushes more seeds upward to the wire mesh door. The wire mesh door stops the seeds from being pushed out of the pipe but allows birds to pull a small amount of seeds through the wire mesh door onto the platform. The seeds held beneath the wire mesh door are not subject to being blown off the platform by wind, etc. The bird feeder of the present invention does not block view of feeding birds.

DESCRIPTION OF THE PREFERRED EMBODIMENT

Figure 1:
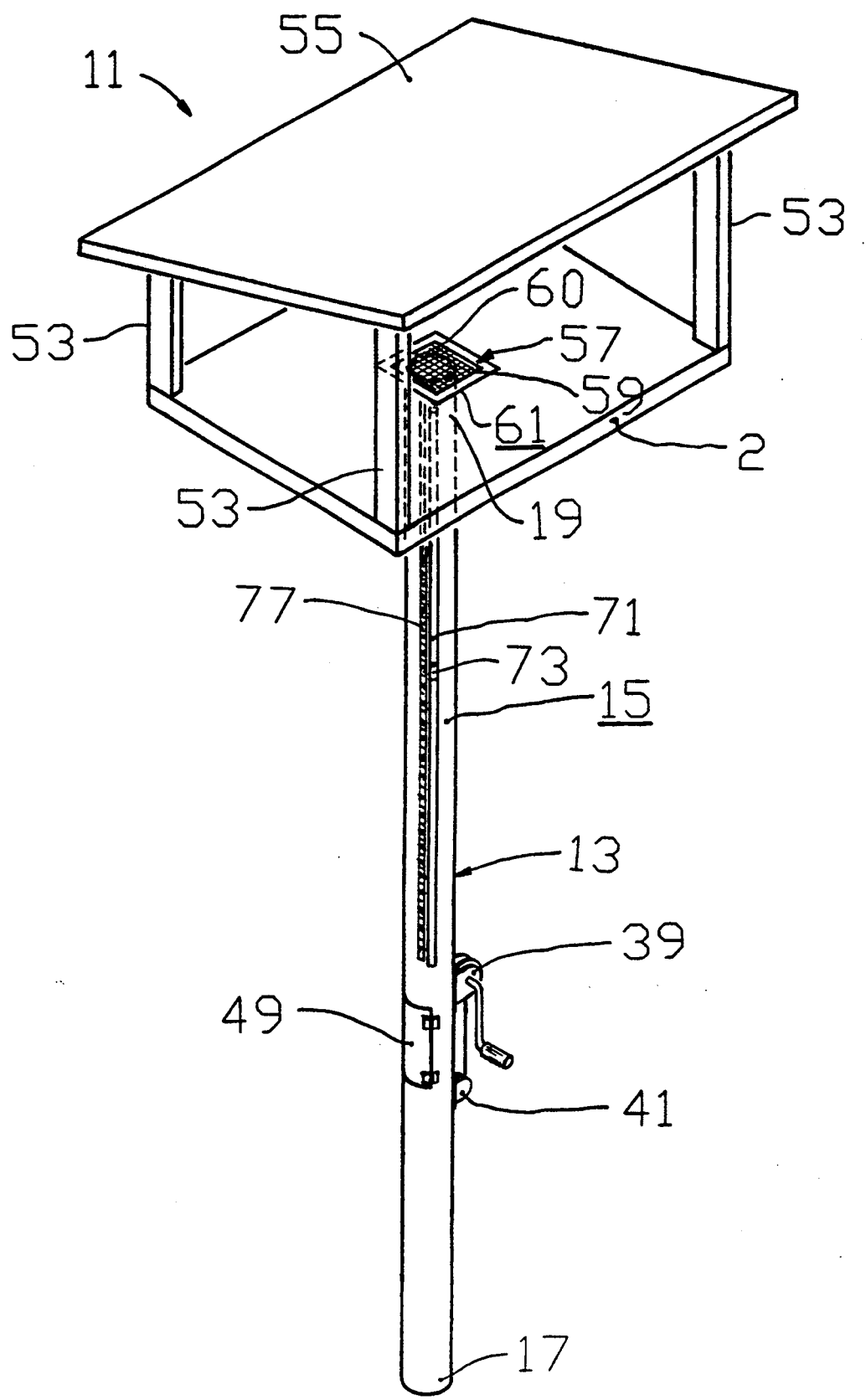
FIG. 1 is a perspective view of the bird feeder of the present invention.

The preferred embodiment of the bird feeder of the present invention is shown in FIG. 1 and identified by the numeral 11.

The bird feeder 11 includes a reservoir 13 for holding a supply of bird feed. The reservoir 13 includes an elongated pipe 15 having a hollow interior for holding the bird feed. The pipe has a lower end 17 for being embedded in the ground to hold the pipe 15 vertical, and has an open upper end 19 for allowing bird feed to be added to and removed from the hollow interior thereof.

A coil spring 21 is positioned within the hollow interior of the pipe 15 beneath the supply of bird feed for normally urging the bird feed upward through the open upper end 19 of the pipe 15. Support means such as bolts 23 extend through the pipe 15 into the hollow interior thereof for supporting the lower end 25 of the coil spring 21 within the hollow interior of the pipe 15. A plunger 27 is positioned on the upper end 29 of the coil spring 21. The plunger 27 separates the supply of bird feed from the coil spring 21. The coil spring 21 is sized so that when fully extended, the upper end 29 thereof will be located adjacent the upper end 19 of the pipe 15.

Figure 2:
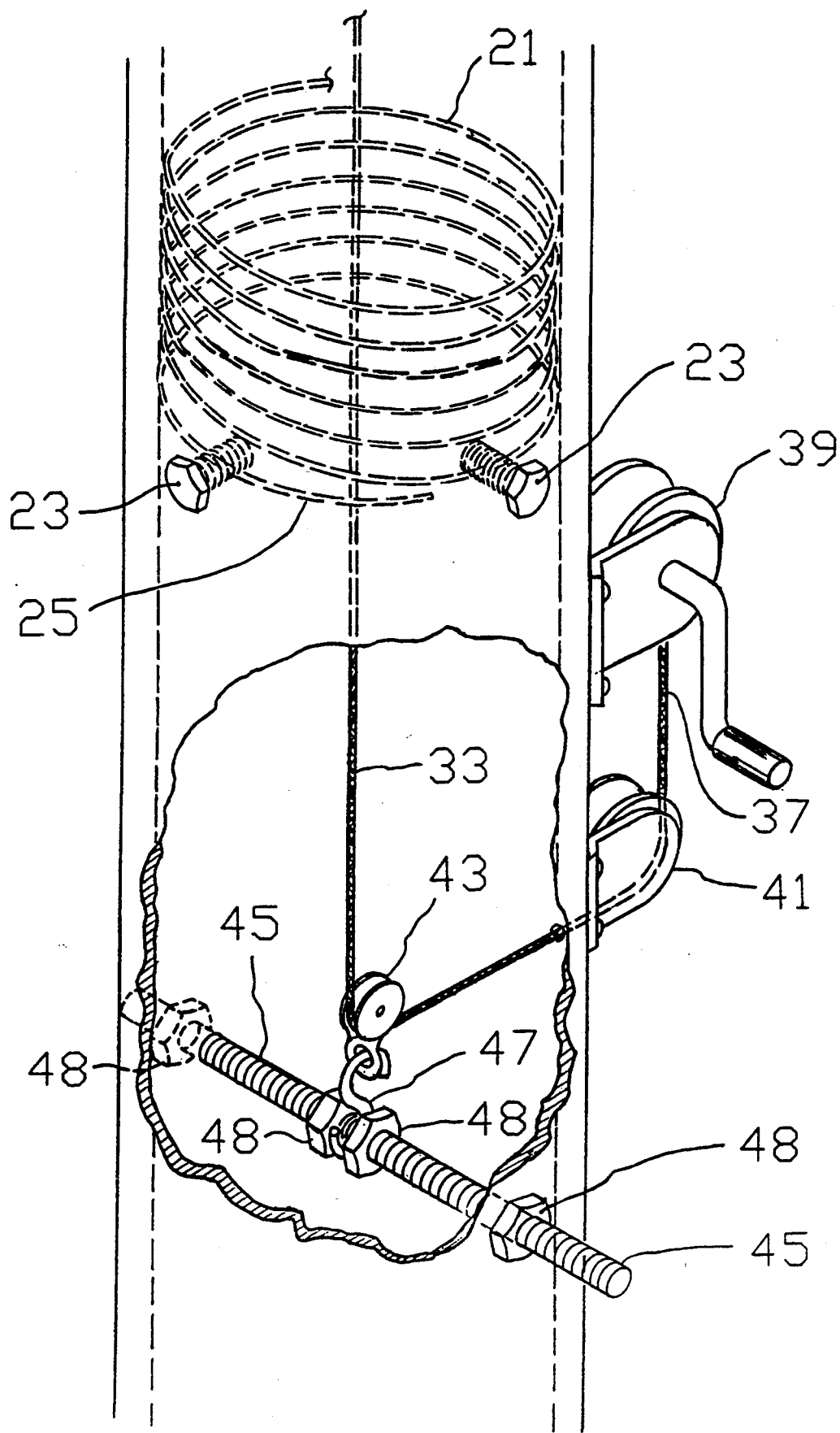
FIG. 2 is enlarged view of a portion of the bird feeder of FIG. 1 with portions thereof broken away and omitted for clarity.
Figure 3:
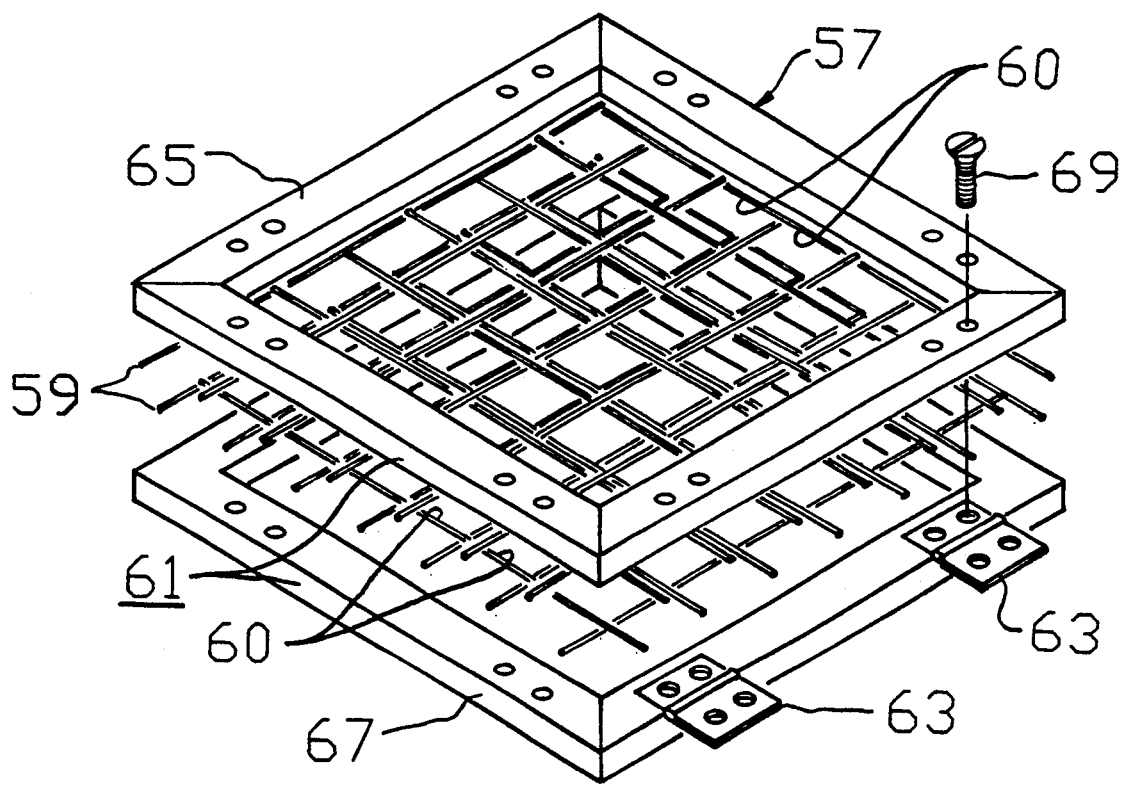
FIG. 3 is an exploded perspective view of a wire mesh door of the bird feeder of the present invention.
Figure 4:
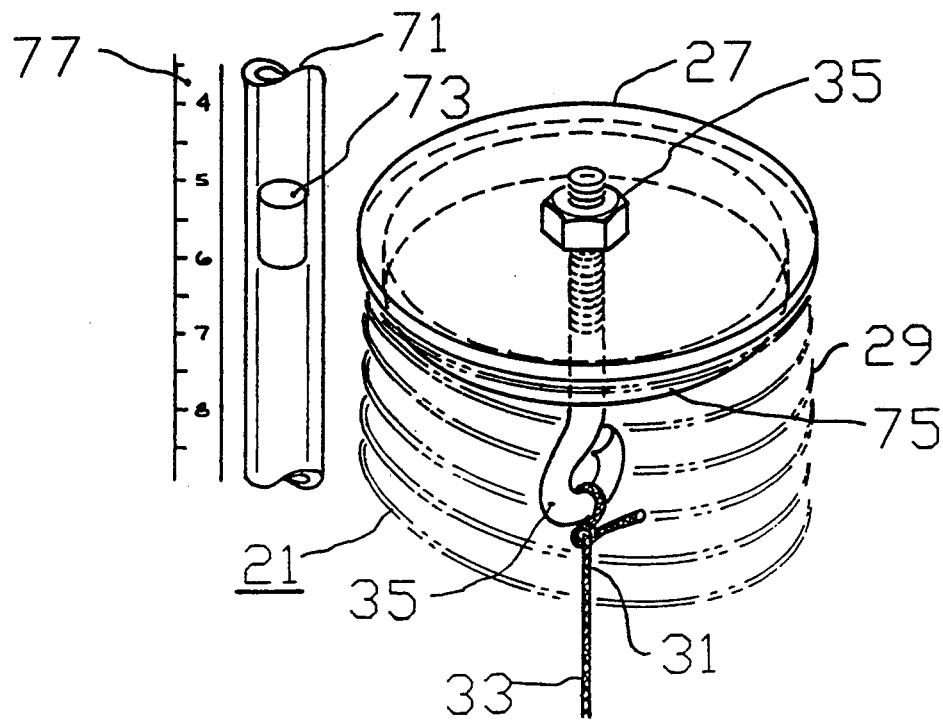
FIG. 4 is a diagrammatic view of the certain portions of the bird feeder of the present invention, showing the operation of the seed level indicating means thereof.

A first end 31 of a cable 33 is attached to the plunger 27 by way of a eyebolt 35. The second end 37 of the cable 33 is attached to a winch means 39 so that the winch means 39 can be used to compress the coil spring 21 by pulling the plunger 27 downwardly against the upper end 29 of the coil spring 21. The winch means 39 is attached to the outer wall of the pipe 15 and the cable 33 is guided from the winch means 39 to the plunger 27 by an external pulley 41 attached to the outer wall of the pipe 15 just below the winch means 39 and an internal pulley 43 mounted within the hollow interior of the pipe 15 below the lower end 25 of the coil spring 21 by a cross rod 45 and an S-hook 47. The cross rod 45 is preferably threaded and nuts 48 are provided to hold the cross rod 45 in place on the pipe 15 and to hold the S-hook 47 centered as clearly shown in FIG. 2. An access door 49 is provided in the pipe 15 to allow access to the internal pulley 41, etc.

A rigid platform 51 is attached to and encircles the open upper end 19 of the pipe 15. The platform 51 is preferably rectangular and a post 53 extends upward from each corner thereof to support a roof 55.

A cover means 57 is positioned over the open upper end 19 of the pipe 15 for keeping the bird feed within the pipe 15 under tension while allowing birds to pick bird feed therefrom. The cover means 57 includes a wire mesh panel 59 that covers the open upper end 19 of the pipe 15 and prevents the bird feed from freely being forced or urged out the open upper end 19 of the pipe 15. The wire mesh panel 59 of the cover means 57 has apertures 60 therethrough sized to allow birds to pick bird feed therethrough while preventing bird feed from freely passing out the open upper end 19 of the pipe 15. The cover means 57 may include an open door frame 61 attached to the platform 51 over the open upper end 19 of the pipe 15 by hinges 63. The door frame 61 may include a first frame member 65 and a second frame member 67 held together by one or more screws 69 for sandwiching the wire mesh panel 59 therebetween. A rotatable latch may be mounted on the platform 51 to hold the cover means 57 closed.

The bird feeder 11 includes indicator means for showing the level of bird feed within the pipe 15. The indicator means may include a clear tube 71 attached vertically to the outside of the pipe 15. The tube 71 has a hollow interior and the indicator means includes a magnetic piston 73 slidably mounted within the hollow interior of the tube 71 and a coacting magnetic member 75 attached relative to the plunger 27 with the magnetic piston 73 and the coacting magnetic member 75 associated with one another in such a way that when the coacting magnetic member 75 moves up and down within the interior of the pipe 15, the magnetic piston 73 will move up and down within the clear tube 71 a like amount. The indicator means may include a measuring tape 77 or the like attached to the outside of the pipe 15 adjacent the clear tube 71 for allowing actual measurements of the height of the magnetic piston 73 within the clear tube to be noted and, thereby, allow the actual level of bird feed within the interior of the pipe 15 to be determined.

Although the present invention has been described and illustrated with respect to a preferred embodiment and a preferred use therefor, it is not to be so limited since modifications and changes can be made therein which are within the full intended scope of the invention.

I claim:

1. A bird feeder for holding and dispensing bird feed; said bird feeder comprising:

(a) a pipe having a hollow interior for holding a supply of bird feed; said pipe including a lower end for embedding in the ground and having an open upper end;

(b) a coil spring positioned within said hollow interior of said pipe, said coil spring having a lower end and an upper end;

(c) support means for supporting said lower end of said coil spring within said hollow interior of said pipe;

(d) a plunger slidably positioned within said hollow interior of said pipe and positioned on said upper end of said coil spring;

(d) a cable having a first end attached to said plunger and having a second end;

(e) guide means for guiding said cable from said plunger to a point below said lower end of said coil spring;

(f) winch means coupled to said second end of said cable for pulling said plunger downwardly toward said lower end of said coil spring and for compressing said coil spring;

(g) a rigid platform attached to and encircling said open upper end of said pipe;

(h) cover means for coveting said open upper end of said pipe and for keeping the bird feed within said pipe under tension, said cover means having apertures therethrough sized to allow birds to pick bird feed therethrough while preventing bird feed from freely passing out said open upper end of said pipe; and (i) indicator means for showing the level of bird feed within said pipe; said indicator means including a clear tube positioned on the exterior of said pipe, a magnetic piston slidably positioned within said clear robe, a coacting magnetic member attached to said plunger for moving up and down with said plunger, and measuring indicia positioned on the exterior of said pipe adjacent said clear tube for allowing actual measurements of the height of said magnetic piston within said clear tube to be noted whereby the level of the bird feed in said hollow interior of said pipe is indicated by the relative position of said magnetic piston and said measuring indicia;

whereby said plunger can be pulled downwardly within said pipe by said winch means to compress said coil spring and allow a supply of bird feed to be added to said hollow interior of said pipe through said open upper end thereof, and whereby when said second end of said cable is released, the bird feed in said hollow interior of said pipe will be constantly pushed against said cover means; and whereby when birds pick bird feed from said hollow interior of said pipe through said cover means, new seeds will be pushed against said cover means.

* * * * *

UNITED STATES PATENT AND TRADEMARK OFFICE
CERTIFICATE OF CORRECTION

PATENT NO. : 5,339,767
DATED : August 23, 1994
INVENTOR(S) : Jeffrey B. Krag It is certified that error appears in the above-identified patent and that said Letters Patent is hereby corrected as shown below:

On the title page, item [76]
Address line: "215 DiNard Rd." should be - 215 Dillard Rd. -

Signed and Sealed this

Eighteenth Day of October, 1994

Attest:

BRUCE LEHMAN

Attesting Officer

Commissioner of Patents and Trademarks